(12) United States Patent
Horn et al.

(10) Patent No.: US 9,794,259 B2
(45) Date of Patent: Oct. 17, 2017

(54) SECURITY FOR ACCESS TO THE IP MULTIMEDIA SUBSYSTEM (IMS) WITH WEB REAL TIME COMMUNICATION (WEBRTC)

(71) Applicant: NOKIA SOLUTIONS AND NETWORKS OY, Espoo (FI)

(72) Inventors: Guenther Horn, Munich (DE); Alexander Milinski, München (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/595,555

(22) Filed: Jan. 13, 2015

(65) Prior Publication Data
US 2015/0200946 A1    Jul. 16, 2015

Related U.S. Application Data

(60) Provisional application No. 61/926,621, filed on Jan. 13, 2014.

(51) Int. Cl.
*H04L 29/06* (2006.01)
*G06F 21/31* (2013.01)

(52) U.S. Cl.
CPC ............ *H04L 63/10* (2013.01); *G06F 21/31* (2013.01); *H04L 63/08* (2013.01)

(58) Field of Classification Search
CPC ......... H04L 63/10; H04L 63/08; G06F 21/31; G06Q 20/322; H04N 21/4788; H04W 12/08; H04W 4/24; H04W 84/042; H04W 88/02; H04W 8/04
USPC ................................ 726/1, 2, 3, 4
See application file for complete search history.

(56) References Cited

U.S. PATENT DOCUMENTS

| | | | |
|---|---|---|---|
| 2012/0300916 A1* | 11/2012 | Woicke | H04M 3/5235 379/201.12 |
| 2014/0126708 A1* | 5/2014 | Sayko | H04M 11/00 379/93.01 |

OTHER PUBLICATIONS

3GPP TR 23.701 V12.0.0 (Dec. 2013); 3rd Generation Partnership Project; Technical Specification Group Services and System Aspects; Study on Web Real Time Communication (WebRTC) access to IP Multimedia Subsystem (IMS); Stage 2 (Release 12).*

(Continued)

*Primary Examiner* — Kambiz Zand
*Assistant Examiner* — Abiy Getachew
(74) *Attorney, Agent, or Firm* — Squire Patton Boggs (US) LLP

(57) ABSTRACT

Systems, methods, apparatuses, and computer program products for providing security between WebRTC clients and IMS are provided. One method includes storing, by a network node, at least one parameter per internet protocol multimedia subsystem (IMS) subscription, where the at least one parameter comprises at least one identity of any web real time communication (WebRTC) web server function that is authorized to authenticate an IMS subscriber in WebRTC. The method may further include receiving a WebRTC web server function identity from a call state control function, comparing the received WebRTC web server function identity with the at least one parameter associated with the IMS subscription, and rejecting IMS communication when there is not a match between the received WebRTC web server function identity and the at least one parameter associated with the IMS subscription.

13 Claims, 5 Drawing Sheets

(56) References Cited

OTHER PUBLICATIONS

3GPP TR 23.701 V12.0.0 (Dec. 2013); "3rd Generation Partnership Project; Technical Specification Group Services and System Aspects; Study on Web Real Time Communication (WebRTC) access to IP Multimedia Subsystem (IMS); Stage 2 (Release 12)." (59 pages).

3GPP TR 33.abc V0.1.0 (Nov. 2013); "3rd Generation Partnership Project; Technical Specification Group Services and System Aspects; Study on Security for WebRTC IMS Client access to IMS; (Release 12)." (14 pages).

* cited by examiner

SECURITY FOR ACCESS TO THE IP MULTIMEDIA SUBSYSTEM (IMS) WITH WEB REAL TIME COMMUNICATION (WEBRTC)

CROSS-REFERENCE TO RELATED APPLICATIONS

This application claims priority from U.S. Provisional Application No. 61/926,621, filed on Jan. 13, 2014. The entire contents of this earlier filed application are hereby incorporated by reference in their entirety.

BACKGROUND

Field

Embodiments of the invention generally relate to web real time communication (WebRTC) and, in particular, some embodiments may relate to security aspects of WebRTC clients' access to the internet protocol (IP) multimedia subsystem (IMS).

Description of the Related Art

The internet protocol (IP) multimedia subsystem (IMS) is an architectural framework for delivering IP multimedia services. In order to facilitate integration with the Internet, IMS uses internet engineering task force (IETF) protocols, such as session initiation protocol (SIP), when possible. IMS is designed to assist in the access of voice and multimedia applications from wireless terminals or devices.

Web Real Time Communication (WebRTC) is a new technology that enables real-time communication from a client's web browser by executing Javascript code downloaded from a suitable server. 3GPP has started activities to standardize the access to the IMS from WebRTC clients.

SUMMARY

One embodiment is directed to a method that may include storing, by a network node, at least one parameter per internet protocol multimedia subsystem (IMS) subscription. The at least one parameter comprises at least one identity of any web real time communication (WebRTC) web server function that is authorized to authenticate an internet protocol multimedia subsystem (IMS) subscriber in WebRTC. The method may also include receiving a web real time communication (WebRTC) web server function identity from a call state control function, comparing the received web real time communication (WebRTC) web server function identity with the at least one parameter associated with the internet protocol multimedia subsystem (IMS) subscription, and rejecting internet protocol multimedia subsystem (IMS) communication when there is not a match between the received web real time communication (WebRTC) web server function identity and the at least one parameter associated with the internet protocol multimedia subsystem (IMS) subscription.

In an embodiment, the network node comprises a home subscriber server (HSS), and the call state control function comprises an interrogating call state control function (I-CSCF) or a serving call state control function (S-CSCF).

Another embodiment is directed to an apparatus, which may include at least one processor and at least one memory including computer program code. The at least one memory and computer program code are configured, with the at least one processor, to cause the apparatus at least to store at least one parameter per internet protocol multimedia subsystem (IMS) subscription. The at least one parameter comprises at least one identity of any web real time communication (WebRTC) web server function that is authorized to authenticate an internet protocol multimedia subsystem (IMS) subscriber in WebRTC. The at least one memory and computer program code are also configured, with the at least one processor, to cause the apparatus at least to receive a web real time communication (WebRTC) web server function identity from a call state control function, compare the received web real time communication (WebRTC) web server function identity with the at least one parameter associated with the internet protocol multimedia subsystem (IMS) subscription, and reject internet protocol multimedia subsystem (IMS) communication when there is not a match between the received web real time communication (WebRTC) web server function identity and the at least one parameter associated with the internet protocol multimedia subsystem (IMS) subscription.

In an embodiment, the apparatus comprises a home subscriber server (HSS), and the call state control function comprises an interrogating call state control function (I-CSCF) or a serving call state control function (S-CSCF).

Another embodiment is directed to an apparatus that may include means for storing at least one parameter per internet protocol multimedia subsystem (IMS) subscription. The at least one parameter comprises at least one identity of any web real time communication (WebRTC) web server function that is authorized to authenticate an internet protocol multimedia subsystem (IMS) subscriber in WebRTC. The apparatus may also include means for receiving a web real time communication (WebRTC) web server function identity from a call state control function, means for comparing the received web real time communication (WebRTC) web server function identity with the at least one parameter associated with the internet protocol multimedia subsystem (IMS) subscription, and means for rejecting internet protocol multimedia subsystem (IMS) communication when there is not a match between the received web real time communication (WebRTC) web server function identity and the at least one parameter associated with the internet protocol multimedia subsystem (IMS) subscription.

Another embodiment is directed to a computer program, embodied on a non-transitory computer readable medium. The computer program may be configured to control a processor to perform a process that may include storing at least one parameter per internet protocol multimedia subsystem (IMS) subscription. The at least one parameter comprises at least one identity of any web real time communication (WebRTC) web server function that is authorized to authenticate an internet protocol multimedia subsystem (IMS) subscriber in WebRTC. The process may also include receiving a web real time communication (WebRTC) web server function identity from a call state control function, comparing the received web real time communication (WebRTC) web server function identity with the at least one parameter associated with the internet protocol multimedia subsystem (IMS) subscription, and rejecting internet protocol multimedia subsystem (IMS) communication when there is not a match between the received web real time communication (WebRTC) web server function identity and the at least one parameter associated with the internet protocol multimedia subsystem (IMS) subscription.

Another embodiment is directed to a method that may include retrieving, by a call state control function, at least one identity for all web real time communication (WebRTC) web server function identities associated with an internet protocol multimedia subsystem (IMS) subscription from a home subscriber server, receiving a web real time communication (WebRTC) web server function identity from a proxy call state control function enhanced for WebRTC (eP-CSCF), comparing the at least one identity for all web real time communication (WebRTC) web server function identities with the WebRTC web server function identity received from the call state control function, and rejecting an internet protocol multimedia subsystem (IMS) communication when there is not a match between the at least one identity for all web real time communication (WebRTC) web server function identities and the WebRTC web server function identity received from the call state control function.

In an embodiment, the method may also include sending the WebRTC web server function identity received from the proxy call state control function enhanced for WebRTC (eP-CSCF) to a home subscriber server (HSS).

Another embodiment is directed to an apparatus that may include at least one processor and at least one memory including computer program code. The at least one memory and computer program code are configured, with the at least one processor, to cause the apparatus at least to retrieve at least one identity for all web real time communication (WebRTC) web server function identities associated with an internet protocol multimedia subsystem (IMS) subscription from a home subscriber server, receive a web real time communication (WebRTC) web server function identity from a proxy call state control function enhanced for WebRTC (eP-CSCF), compare the at least one identity for all web real time communication (WebRTC) web server function identities with the WebRTC web server function identity received from the call state control function, and reject an internet protocol multimedia subsystem (IMS) communication when there is not a match between the at least one identity for all web real time communication (WebRTC) web server function identities and the WebRTC web server function identity received from the call state control function.

In an embodiment, the at least one memory and computer program code are further configured, with the at least one processor, to cause the apparatus at least to send the WebRTC web server function identity received from the proxy call state control function enhanced for WebRTC (eP-CSCF) to a home subscriber server (HSS). According to one embodiment, the apparatus comprises an interrogating call state control function or a serving call state control function.

Another embodiment is directed to an apparatus that may include means for retrieving at least one identity for all web real time communication (WebRTC) web server function identities associated with an internet protocol multimedia subsystem (IMS) subscription from a home subscriber server, means for receiving a web real time communication (WebRTC) web server function identity from a proxy call state control function enhanced for WebRTC (eP-CSCF), means for comparing the at least one identity for all web real time communication (WebRTC) web server function identities with the WebRTC web server function identity received from the call state control function, and means for rejecting an internet protocol multimedia subsystem (IMS) communication when there is not a match between the at least one identity for all web real time communication (WebRTC) web server function identities and the WebRTC web server function identity received from the call state control function.

Another embodiment is directed to a computer program, embodied on a non-transitory computer readable medium. The computer program may be configured to control a processor to perform a process that may include retrieving at least one identity for all web real time communication (WebRTC) web server function identities associated with an internet protocol multimedia subsystem (IMS) subscription from a home subscriber server, receiving a web real time communication (WebRTC) web server function identity from a proxy call state control function enhanced for WebRTC (eP-CSCF), comparing the at least one identity for all web real time communication (WebRTC) web server function identities with the WebRTC web server function identity received from the call state control function, and rejecting an internet protocol multimedia subsystem (IMS) communication when there is not a match between the at least one identity for all web real time communication (WebRTC) web server function identities and the WebRTC web server function identity received from the call state control function.

Another embodiment is directed to a method that may include storing, by a network node, at least one parameter comprising identities of any web real time communication (WebRTC) web server functions that are blocked, receiving a web real time communication (WebRTC) web server function identity from a call state control function, comparing the WebRTC web server function identity received from the call state control function with the blocked WebRTC web server function identities, and rejecting an internet protocol multimedia subsystem (IMS) communication when there is a match between the WebRTC web server function identity received from the call state control function and the blocked WebRTC web server function identities.

In one embodiment, the network node comprises a home subscriber server (HSS), and the call state control function comprises an interrogating call state control function (I-CSCF) or a serving call state control function (S-CSCF). According to an embodiment, the rejecting further comprises informing all serving call state control functions of the blocking of the WebRTC web server function identities. In certain embodiments, the at least one parameter is added once to the home subscriber server (HSS).

Another embodiment is directed to an apparatus that may include at least one processor and at least one memory including computer program code. The at least one memory and computer program code are configured, with the at least one processor, to cause the apparatus at least to store at least one parameter comprising identities of any web real time communication (WebRTC) web server functions that are blocked, receive a web real time communication (WebRTC) web server function identity from a call state control function, compare the WebRTC web server function identity received from the call state control function with the blocked WebRTC web server function identities, and reject an internet protocol multimedia subsystem (IMS) communication when there is a match between the WebRTC web server function identity received from the call state control function and the blocked WebRTC web server function identities.

In an embodiment, the apparatus comprises a home subscriber server (HSS), and the call state control function comprises an interrogating call state control function (I-CSCF) or a serving call state control function (S-CSCF). According to one embodiment, the at least one memory and computer program code are further configured, with the at least one processor, to cause the apparatus at least to inform all serving call state control function of the blocking of the WebRTC web server function identities. In certain embodiments, the at least one parameter is added once to the home subscriber server (HSS).

Another embodiment is directed to an apparatus that may include means for storing at least one parameter comprising identities of any web real time communication (WebRTC) web server functions that are blocked, means for receiving a web real time communication (WebRTC) web server function identity from a call state control function, means for comparing the WebRTC web server function identity received from the call state control function with the blocked WebRTC web server function identities, and means for rejecting an internet protocol multimedia subsystem (IMS) communication when there is a match between the WebRTC web server function identity received from the call state control function and the blocked WebRTC web server function identities.

Another embodiment is directed to a computer program, embodied on a non-transitory computer readable medium. The computer program may be configured to control a processor to perform a process that may include storing at least one parameter comprising identities of any web real time communication (WebRTC) web server functions that are blocked, receiving a web real time communication (WebRTC) web server function identity from a call state control function, comparing the WebRTC web server function identity received from the call state control function with the blocked WebRTC web server function identities, and rejecting an internet protocol multimedia subsystem (IMS) communication when there is a match between the WebRTC web server function identity received from the call state control function and the blocked WebRTC web server function identities.

Another embodiment is directed to a method that may include storing or retrieving, by a network node, identities of any web real time communication (WebRTC) web server functions that are blocked, receiving a web real time communication (WebRTC) web server function identity from a proxy call state control function enhanced for WebRTC (eP-CSCF), comparing the blocked WebRTC web server function identities with the WebRTC web server function identity received from the eP-CSCF, and rejecting internet protocol multimedia subsystem (IMS) communication when there is a match between the blocked WebRTC web server function identities and the WebRTC web server function identity received from the eP-CSCF.

In an embodiment, the retrieving comprises retrieving the identities of WebRTC web server functions that are blocked from a home subscriber server (HSS). According to one embodiment, the method further comprises sending the WebRTC web server function identity received from the eP-CSCF to the HSS. In certain embodiments, the network node comprises a serving call state control function and the method further comprises initiating network deregistration for all users associated with a blocked WebRTC web server function.

Another embodiment is directed to an apparatus that may include at least one processor and at least one memory including computer program code. The at least one memory and computer program code are configured, with the at least one processor, to cause the apparatus at least to store or retrieve identities of any web real time communication (WebRTC) web server functions that are blocked, receive a web real time communication (WebRTC) web server function identity from a proxy call state control function enhanced for WebRTC (eP-CSCF), compare the blocked WebRTC web server function identities with the WebRTC web server function identity received from the eP-CSCF, and reject internet protocol multimedia subsystem (IMS) communication when there is a match between the blocked WebRTC web server function identities and the WebRTC web server function identity received from the eP-CSCF.

In one embodiment, the at least one memory and computer program code are further configured, with the at least one processor, to cause the apparatus at least to retrieve the identities of WebRTC web server functions that are blocked from a home subscriber server (HSS). According to an embodiment, the at least one memory and computer program code are further configured, with the at least one processor, to cause the apparatus at least to send the WebRTC web server function identity received from the eP-CSCF to the HSS. In certain embodiments, the apparatus comprises a serving call state control function, and the at least one memory and computer program code are further configured, with the at least one processor, to cause the apparatus at least to initiate network deregistration for all users associated with a blocked WebRTC web server function.

Another embodiment is directed to an apparatus that may include means for storing or retrieving identities of any web real time communication (WebRTC) web server functions that are blocked, means for receiving a web real time communication (WebRTC) web server function identity from a proxy call state control function enhanced for WebRTC (eP-CSCF), means for comparing the blocked WebRTC web server function identities with the WebRTC web server function identity received from the eP-CSCF, and means for rejecting internet protocol multimedia subsystem (IMS) communication when there is a match between the blocked WebRTC web server function identities and the WebRTC web server function identity received from the eP-CSCF.

In an embodiment, the means for retrieving comprises means for retrieving the identities of WebRTC web server functions that are blocked from a home subscriber server (HSS). According to one embodiment, the apparatus further comprises means for sending the WebRTC web server function identity received from the eP-CSCF to the HSS. In certain embodiments, the apparatus comprises a serving call state control function and the apparatus further comprises means for initiating network deregistration for all users associated with a blocked WebRTC web server function.

Another embodiment is directed to a computer program, embodied on a non-transitory computer readable medium. The computer program may be configured to control a processor to perform a process that may include storing or retrieving identities of any web real time communication (WebRTC) web server functions that are blocked, receiving a web real time communication (WebRTC) web server function identity from a proxy call state control function enhanced for WebRTC (eP-CSCF), comparing the blocked WebRTC web server function identities with the WebRTC web server function identity received from the eP-CSCF, and rejecting internet protocol multimedia subsystem (IMS) communication when there is a match between the blocked WebRTC web server function identities and the WebRTC web server function identity received from the eP-CSCF.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for providing security between WebRTC clients and IMS, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, certain embodiments relate to security aspects of WebRTC clients' access to the IMS. The 3GPP architectural considerations are documented in 3GPP TR 23.701, v0.3.0, "Study on Web Real Time Communication (WebRTC) access to IMS (Stage 2)", and initial security consideration are documented in 3GPP TR 33.abc, v0.1.0, "Study on Security for WebRTC IMS Client access to IMS." 3GPP TR 23.701, v0.3.0 and 3GPP TR 33.abc, v0.1.0 are hereby incorporated by reference in their entirety.

3GPP TR 23.701, Annex A.2.1.1, describes several authentication scenarios that are to be supported by WebRTC access to the IMS. Certain embodiments are applicable to so-called scenario 2 of 3GPP TR 23.701, but embodiments may also be applicable to other scenarios described in 3GPP TR 23.701 and elsewhere.

Figure 1:
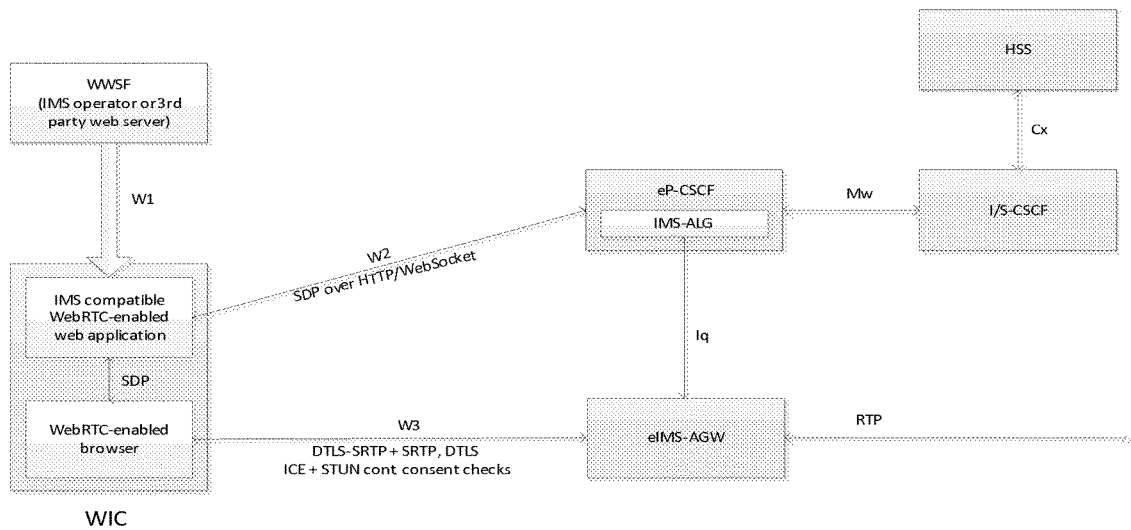
FIG. 1 illustrates an example of a system according to an embodiment.

FIG. 1 illustrates an example of a system according to one embodiment, including the architecture of WebRTC client IMS access. As illustrated in FIG. 1, in this example, the system may include the WebRTC IMS Client (WIC), the WebRTC Web Server Function (WWSF), the Proxy Call State Control Function enhanced for WebRTC (eP-CSCF), the Interrogating Call State Control Function (I-CSCF), the Serving Call State Control Function (S-CSCF), and the Home Subscriber Server (HSS). The I-CSCF, S-CSCF, and HSS and their functionality are well known from the IMS architecture (see for example 3GPP TS 23.228). The IMS-ALG component, the eIMS-AGW, and their interfaces illustrated in FIG. 1 are not necessarily relevant to certain embodiments.

The WIC is a WebRTC Javascript (JS) application capable of interoperating with the WebRTC IMS access architecture. The WIC application may be downloaded from the WWSF and provides access to the communications services of the IMS.

The WWSF is located either in the operator network or a third party network authorized by the operator network. The WWSF may perform the authentication of the WIC based on web credentials and may assert that certain IMS identities of WICs are associated with authenticated web identities of that WIC.

The eP-CSCF is located in the operator network. The eP-CSCF may verify any user equipment (UE) authentication performed by the WWSF by verifying assertions provided by the WWSF, and may perform Trusted Node Authentication (TNA), as defined in 3GPP TS 33.203, Annex U, in IMS for UEs already authenticated by the WWSF. Furthermore, 3GPP TS 23.701 states that the eP-CSCF verifies that the WWSF is authorized to provide assertions about IMS identities associated with a WIC.

In the above-mentioned scenario 2 of 3GPP TR 23.701, the client has a regular IMS subscription, but authentication of the client is provided by using web credentials and some sort of web authentication scheme outside the remit of 3GPP, i.e., not using one of the authentication schemes currently specified by 3GPP. The WIC may register in the IMS with one of its IMPUs (IP Multimedia Public identity) from this existing IMS subscription. The WWSF may perform web authentication and learn the (static) association between the user's IMPU and the user's web identity, for instance, via database lookup. The WWSF would typically generate a token that asserts, for example using cryptographic means, that the WIC with a particular IMPU was authenticated by the WWSF, and this token would be passed to the eP-CSCF via the WIC. The description of scenario 2 does not contain any provisions that would limit the assignment of IMPUs by the WWSF to a particular set of IMPUs associated with this WWSF; hence this could be any IMPU of any IMS subscription.

Because security breaches are always possible, it is desirable that any consequences of such a potential security breach are contained as much as possible. Therefore, embodiments of the invention address and/or prevent consequences of a potential security breach in the web authentication scheme operated by a third party WWSF.

There are at least two related problems that certain embodiments are able to solve; however, embodiments may provide solutions for other problems not enumerated herein. A first problem relates to limiting the impact of a security breach affecting a WWSF, e.g. in the web authentication scheme employed by a WWSF, on IMS subscribers.

If it is assumed that an attacker was able to compromise the security of a WWSF then the attacker could generate false tokens that wrongly assert that the WWSF authenticated a user with an IMPU of the attacker's choice, providing that this IMPU related to an existing IMS subscription. In this way, the attacker could initiate a WebRTC call with this IMPU as originator and hence impersonate the user legitimately associated with this IMPU. This could have not only financial implications for the user and/or the IMS service provider, but could also damage their reputation or result in legal prosecution, depending on the destination and content of the call. While it is true that the eP-CSCF is tasked with verifying that the WWSF is authorized to allocate the IMS identities that it assigns to a WIC, the eP-CSCF could not stop this impersonation as the assumption is that any IMPU relating to an existing IMS subscription could be assigned by the WWSF. The impersonation could affect any IMS subscriber, even if they had no business relationship with any third party (e.g., a social network) operating a WWSF, or would not even use WebRTC.

A second problem relates to selectively blocking a WWSF that is a potential source of security problems. If it is assumed that there is a security breach at one WWSF or that the behavior of WebRTC clients authenticated by one WWSF shows some anomalies, then the IMS service provider will have an interest to isolate the impacts of the security breach without affecting clients associated with other WWSFs. Hence, an IMS service provider should be able to (temporarily) selectively block WWSFs showing security anomalies or suffering from security breaches, without affecting clients associated with other WWSFs.

As suggested above, a first embodiment is directed at least in part to limiting the impact of a security breach affecting a WWSF on IMS subscribers. According to this embodiment, the third party WWSF may only be authorized to assign IMPUs from a well-defined set of IMPUs, i.e., the IMPUs of IMS subscribers that have chosen the option to access the IMS via this WWSF's web authentication scheme, and not for arbitrary IMPUs. This embodiment may include some or all of the following enhancements to existing IMS systems.

For example, in this embodiment, the HSS may be enhanced by having it store one or several additional parameters per IMS subscription, namely the identity/identities of any WWSF that is authorized to authenticate the IMS subscriber in WebRTC. Conversely, the lack of such an additional parameter in the data of an IMS subscription would indicate that, for this IMS subscription, authentication is not allowed by any WWSF.

In this embodiment, the eP-CSCF may be enhanced, with respect to both the eP-CSCF as described in 3GPP TR 23.701 and an existing P-CSCF, by having it send the identity/identities of any WWSF from which the eP-CSCF received an assertion relating to authentication of an IMS subscriber in WebRTC to the I-/S-CSCF as part of the registration message.

Additionally, in this embodiment, the I-CSCF or S-CSCF may be enhanced in at least one of two possible ways: a) by having it retrieve the identity/identities of all WWSF identities associated with an IMS subscription from the HSS, and/or b) by having it send the WWSF identity received from the eP-CSCF to the HSS.

Figure 2:
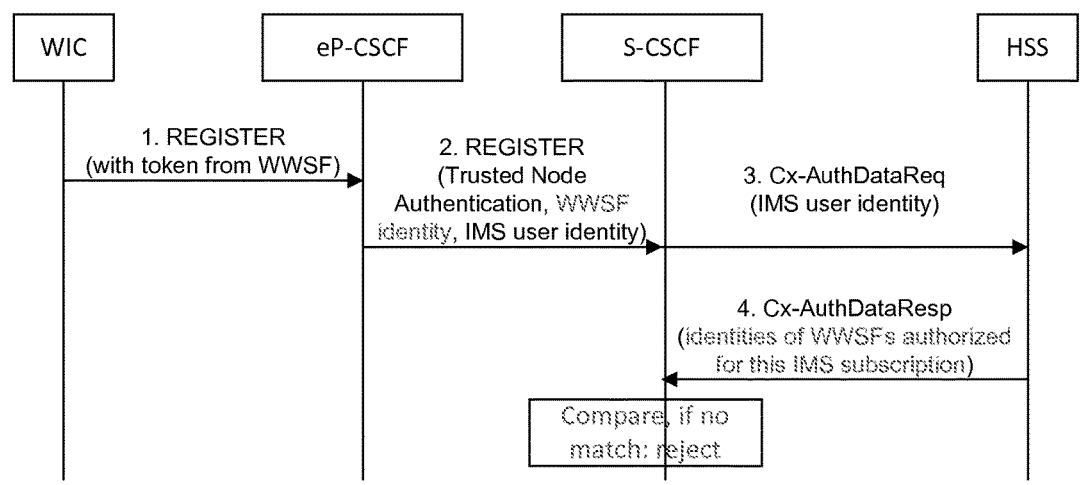
FIG. 2 illustrates an example of a flow diagram of a method according to one embodiment.

Furthermore, in this embodiment, the I-CSCF, S-CSCF and/or the HSS are enhanced with a comparison and rejection function. For example, when the I-CSCF or S-CSCF is configured to retrieve the identity/identities of all WWSF identities associated with an IMS subscription from the HSS (e.g., case a) mentioned above), the I-CSCF or S-CSCF may compare the identity/identities of all WWSF identities associated with an IMS subscription from the HSS with the WWSF identity received from the eP-CSCF and reject the IMS communication when there is no match. FIG. 2 illustrates a signaling diagram depicting an example information flow for checking authorization of WWSF per IMS subscription according to this example.

When the I-CSCF or S-CSCF is configured to send the WWSF identity received from the eP-CSCF to the HSS (e.g., case b) mentioned above), the HSS may compare the WWSF identity received from the I-CSCF or S-CSCF with the identity/identities of all WWSF identities associated with an IMS subscription stored in the HSS and rejects the IMS communication when there is no match.

As mentioned above, a second embodiment is directed at least in part to selectively blocking a WWSF that is a potential source of security problems. Some might believe that an approach for selectively blocking a WWSF that is a potential source of security problems, according to this second embodiment, is superfluous because, if a WWSF was to be blocked, one could simply remove the WWSF identities stored in the HSS according to the first embodiment, and then indeed no communication relating to this WWSF would succeed. However, this would be very cumbersome as a large number of IMS subscription records could be affected. Furthermore, the security problem with a WWSF could be temporary, and then all those WWSF identities would have to be added back to this large number of IMS subscription records once the WWSF security problem was fixed. Therefore, this second embodiment is additionally useful.

This second embodiment may use mechanisms somewhat similar to the ones defined for the first embodiment discussed above. It should be noted that the first embodiment discussed above and the second embodiment discussed below can co-exist and can be used in parallel.

This embodiment may include some or all of the following enhancements to existing IMS systems. For example, in this embodiment, the HSS may be enhanced by having it store one or several additional parameters, namely the identities of any WWSFs that are blocked (the difference here from the first embodiment is that the additional parameters are added once to the HSS and not per IMS subscription). The HSS may also be enhanced by informing all S-CSCFs about the blocking of the WWSF (e.g., HSS-initiated push message).

In this embodiment, the eP-CSCF may be enhanced, with respect to both the eP-CSCF as described in 3GPP TR 23.701 and an existing P-CSCF, by having it send the identity/identities of any WWSF, from which the eP-CSCF received an assertion relating to authentication of an IMS subscriber in WebRTC.

In addition, in this embodiment, the I-CSCF or S-CSCF may be enhanced in at least one of the following possible ways:
  c) by having it store the identity of the WWSF for each user, based on the indication received from the eP-CSCF as per the first embodiment; (In the first embodiment, the S-CSCF needs to use the WWSF ID only for the registration process. In this embodiment, it needs to store it for the whole registration period).
  d) by having it retrieve all blocked WWSF identities from the HSS; (The difference from the first embodiment is that a different type of additional parameters is retrieved).
  e) by having it send the WWSF identity received from the eP-CSCF to the HSS.
  f) by having it store one or several additional parameters, namely the identities of any WWSFs that are blocked if this storage is not done in the HSS.
  g) only for the S-CSCF: by having it initiate the network initiated deregistration for all users associated with a blocked WWSF, where the affected users are identified as per c) above. This avoids communication of users which were authenticated by the blocked WWSF at a time, when the WWSF was not yet blocked, but might have been compromised already.

Figure 3:
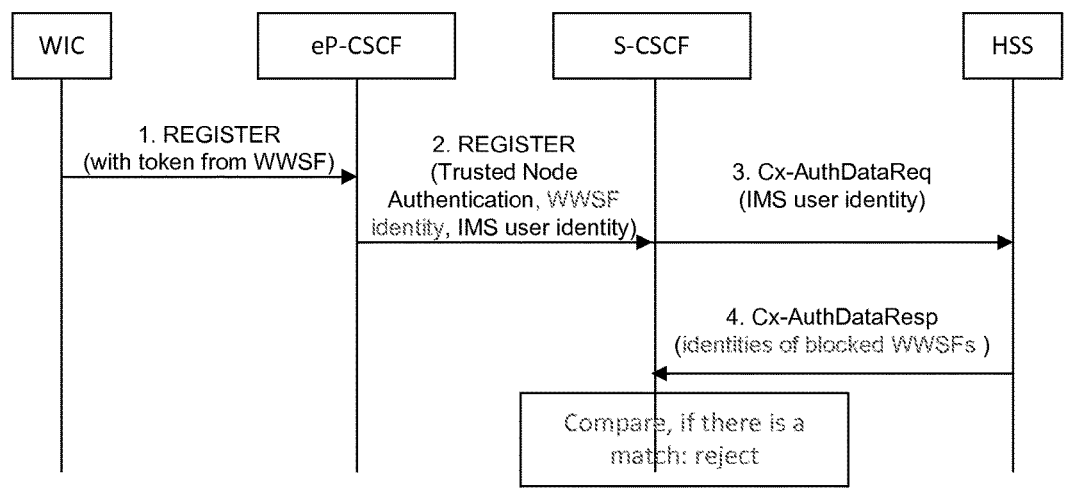
FIG. 3 illustrates an example of a flow diagram of a method according to another embodiment.

Furthermore, in this embodiment, the I-CSCF, S-CSCF and/or the HSS may be enhanced with a comparison and rejection function. For example, when the I-CSCF or S-CSCF are configured to retrieve all blocked WWSF identities from the HSS (i.e., case d) discussed above), the I-CSCF or S-CSCF may compare the blocked WWSF identities received from the HSS with the WWSF identity received from the eP-CSCF and reject the IMS communication when there is a match. FIG. 3 illustrates a signaling diagram depicting an example information flow for blocking compromised WWSFs according to this example.

When the I-CSCF or S-CSCF are configured to send the WWSF identity received from the eP-CSCF to the HSS (i.e., case e) discussed above), the HSS may compare the WWSF identity received from the I-CSCF or S-CSCF with all blocked WWSF identities stored in the HSS and reject the IMS communication when there is a match.

When the I-CSCF or S-CSCF are configured to store one or several additional parameters, such as the identities of any WWSFs that are blocked if this storage is not done in the HSS (i.e., case f) discussed above), the I-CSCF or S-CSCF may compare the blocked WWSF identities stored in the I-CSCF or S-CSCF with the WWSF identity received from the eP-CSCF and reject the IMS communication when there is a match.

Figure 4:
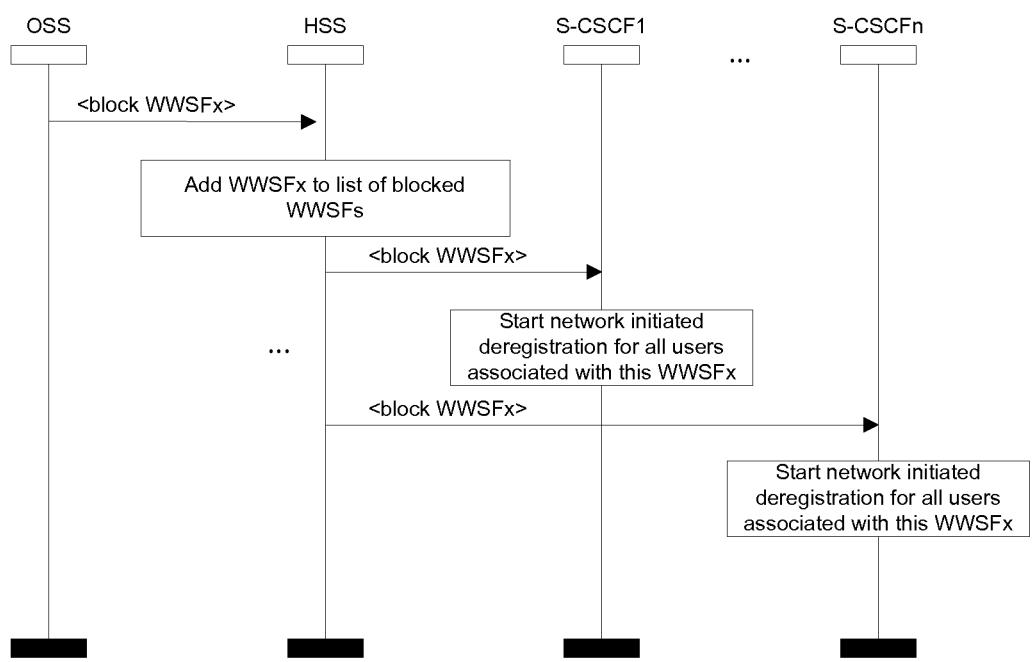
FIG. 4 illustrates an example of a flow diagram of a method according to another embodiment.

FIG. 4 illustrates a signaling diagram depicting an example information flow for the case when the HSS informs all S-CSCFs about the blocking of the WWSF (e.g., HSS-initiated push message) and the S-CSCFs de-registers affected users according to case g) discussed above.

Figure 5:
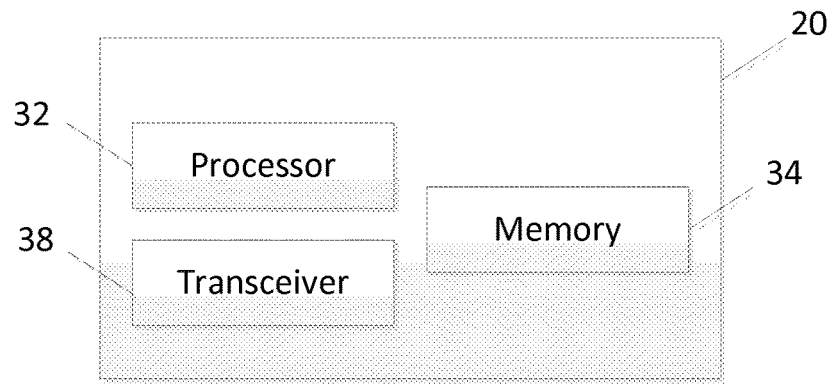
FIG. 5 illustrates a block diagram of an apparatus according to an embodiment.

FIG. 5 illustrates an example of an apparatus 20 according to an embodiment. In an embodiment, apparatus 20 may be a node, host, or server in a communications network or serving such a network, such as a HSS in IMS. It should be noted that one of ordinary skill in the art would understand that apparatus 20 may include components or features not shown in FIG. 5.

As illustrated in FIG. 5, apparatus 20 may include a processor 32 for processing information and executing instructions or operations. Processor 32 may be any type of general or specific purpose processor. While a single processor 32 is shown in FIG. 5, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further comprise or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may further comprise or be coupled to a transceiver 38 configured to transmit and receive information, signals, and/or data.

Processor 32 may perform functions associated with the operation of apparatus 20 including, without limitation, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a server, node or host in a communications network or serving such a network, such as an HSS in an IMS. In this embodiment, apparatus 20 may be controlled by memory 34 and processor 32 to store one or several parameters per IMS subscription. The parameters may include the identity/identities of any WWSF that is authorized to authenticate the IMS subscriber in WebRTC. According to an embodiment, the lack of such additional parameter(s) in the data of an IMS subscription indicates that, for this IMS subscription, authentication is not allowed by any WWSF. In one embodiment, when apparatus 20 receives the WWSF identity sent from the I-CSCF or S-CSCF, apparatus 20 may be controlled to compare the WWSF identity received from the I-CSCF or S-CSCF with the identity/identities of all WWSF identities associated with an IMS subscription stored in the HSS and rejects the IMS communication when there is no match.

In another embodiment, apparatus 20 may be controlled by memory 34 and processor 32 to store one or several parameters, which may be the identities of any WWSFs that are blocked. In this embodiment, the parameter(s) are added once to the HSS (rather than per IMS subscription). In an embodiment, apparatus 20 may be controlled to compare the WWSF identity received from the I-CSCF or S-CSCF with all blocked WWSF identities stored in apparatus 20 and to reject the IMS communication when there is a match. Apparatus 20 may then be controlled to inform all S-CSCFs about the blocking of the WWSF, for example, via a HSS-initiated push message.

Figure 6:
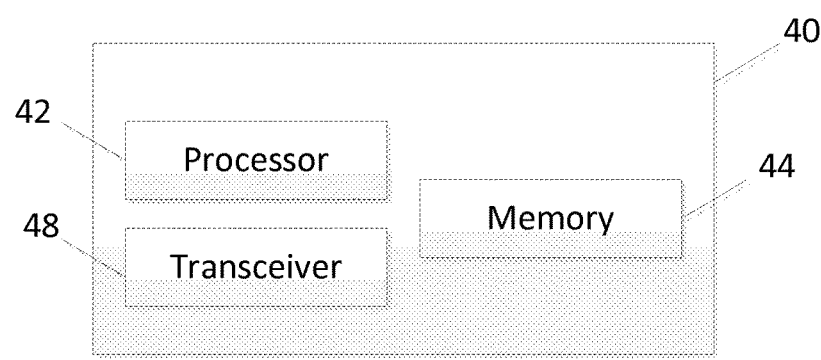
FIG. 6 illustrates a block diagram of an apparatus according to another embodiment.

FIG. 6 illustrates an example of an apparatus 40 according to an embodiment. In an embodiment, apparatus 40 may be a node, host, or server in a communications network or serving such a network, such as an eP-CSCF. It should be noted that one of ordinary skill in the art would understand that apparatus 40 may include components or features not shown in FIG. 6.

As illustrated in FIG. 6, apparatus 40 may include a processor 42 for processing information and executing instructions or operations. Processor 42 may be any type of general or specific purpose processor. While a single processor 42 is shown in FIG. 6, multiple processors may be utilized according to other embodiments. In fact, processor 42 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 40 may further comprise or be coupled to a memory 44 (internal or external), which may be coupled to processor 42, for storing information and instructions that may be executed by processor 42. Memory 44 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 44 may be comprised of any combination of random access memory (RAM), read only memory (ROM), static storage such as a magnetic or optical disk, or any other type of non-transitory machine or computer readable media. The instructions stored in memory 44 may include program instructions or computer program code that, when executed by processor 42, enable the apparatus 40 to perform tasks as described herein.

Apparatus 40 may further comprise or be coupled to a transceiver 48 configured to transmit and receive information, data, or signals.

Processor 42 may perform functions associated with the operation of apparatus 40 including, without limitation, encoding and decoding of individual bits forming a communication message, formatting of information, and overall control of the apparatus 40, including processes related to management of communication resources.

In an embodiment, memory 44 stores software modules that provide functionality when executed by processor 42. The modules may include, for example, an operating system that provides operating system functionality for apparatus 40. The memory may also store one or more functional modules, such as an application or program, to provide additional functionality for apparatus 40. The components of apparatus 40 may be implemented in hardware, or as any suitable combination of hardware and software.

As mentioned above, according to one embodiment, apparatus 40 may be a server, node or host in a communications network or serving such a network, such as an eP-CSCF. In this embodiment, apparatus 40 may be controlled by memory 34 and processor 32 to send the identity/identities of any WWSF from which apparatus 40 received an assertion relating to authentication of an IMS subscriber in WebRTC, to the I/S-CSCF as part of the registration message.

Figure 7:
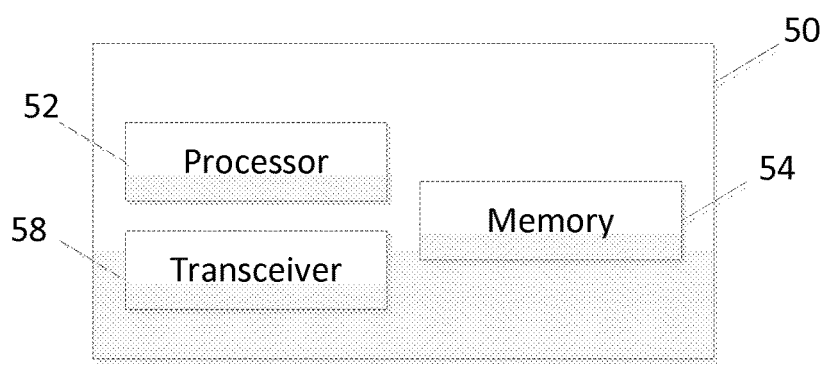
FIG. 7 illustrates a block diagram of an apparatus according to another embodiment.

FIG. 7 illustrates an example of an apparatus 50 according to an embodiment. In an embodiment, apparatus 50 may be a node, host, or server in a communications network or serving such a network, such as an I-CSCF or S-CSCF in IMS. It should be noted that one of ordinary skill in the art would understand that apparatus 50 may include components or features not shown in FIG. 7.

As illustrated in FIG. 7, apparatus 50 may include a processor 52 for processing information and executing instructions or operations. Processor 52 may be any type of general or specific purpose processor. While a single processor 52 is shown in FIG. 7, multiple processors may be utilized according to other embodiments. In fact, processor 52 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 50 may further comprise or be coupled to a memory 54 (internal or external), which may be coupled to processor 52, for storing information and instructions that may be executed by processor 52. Memory 54 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 54 may be comprised of any combination of random access memory (RAM), read only memory (ROM), static storage such as a magnetic or optical disk, or any other type of non-transitory machine or computer readable media. The instructions stored in memory 54 may include program instructions or computer program code that, when executed by processor 52, enable the apparatus 50 to perform tasks as described herein.

Apparatus 50 may further comprise or be coupled to a transceiver 58 configured to transmit and receive information, data, or signals.

Processor 52 may perform functions associated with the operation of apparatus 50 including, without limitation, encoding and decoding of individual bits forming a communication message, formatting of information, and overall control of the apparatus 50, including processes related to management of communication resources.

In an embodiment, memory 54 stores software modules that provide functionality when executed by processor 52. The modules may include, for example, an operating system that provides operating system functionality for apparatus 50. The memory may also store one or more functional modules, such as an application or program, to provide additional functionality for apparatus 50. The components of apparatus 50 may be implemented in hardware, or as any suitable combination of hardware and software.

As mentioned above, according to one embodiment, apparatus 50 may be a server, node or host in a communications network or serving such a network, such as an I-CSCF or S-CSCF in IMS. In an embodiment, apparatus 50 may be controlled by memory 54 and processor 52 to retrieve the identity/identities of all WWSF identities associated with an IMS subscription from the HSS. Apparatus 50 may then be controlled to compare the identity/identities of all WWSF identities associated with an IMS subscription from the HSS with the WWSF identity received from the eP-CSCF and to reject the IMS communication when there is no match. In another embodiment, apparatus 50 may be controlled by memory 54 and processor 52 to send the WWSF identity received from the eP-CSCF to the HSS.

According to another embodiment, apparatus 50 may be controlled by memory 54 and processor 52 to store the identity of the WWSF for each user, based on the indication received from the eP-CSCF. In an embodiment, apparatus 50 may be controlled by memory 54 and processor 52 to retrieve all blocked WWSF identities from the HSS. According to this embodiment, apparatus 50 may then be controlled by memory 54 and processor 52 to compare the blocked WWSF identities retrieved from the HSS with the WWSF identity received from the eP-CSCF and reject the IMS communication when there is a match.

In an embodiment, apparatus 50 may be controlled by memory 54 and processor 52 to send the WWSF identity received from the eP-CSCF to the HSS. In one embodiment, apparatus 50 may be controlled by memory 54 and processor 52 to store one or several additional parameters, which may include the identities of any WWSFs that are blocked if the storing is not done in the HSS. According to this embodiment, apparatus 50 may then be controlled by memory 54 and processor 52 to compare the blocked WWSF identities stored in the I-CSCF or S-CSCF with the WWSF identity received from the eP-CSCF and reject the IMS communication when there is a match.

In an embodiment, when apparatus 50 is the S-CSCF, apparatus 50 may be controlled by memory 54 and processor 52 to initiate the network initiated deregistration for all users associated with a blocked WWSF. This avoids communication of users which were authenticated by the blocked WWSF at a time, when the WWSF was not yet blocked, but might have been compromised already.

In some embodiments, the functionality of any of the methods described herein, such as those illustrated in FIGS. 2-4 discussed above, may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

retrieving, by a call state control function, at least one identity of all web real time communication web server function identities associated with an internet protocol multimedia subsystem subscription from a home subscriber server, wherein the at least one identity comprises an identity or identities of any web real time communication web server function that is authorized to authenticate an internet protocol multimedia subsystem subscriber in web real time communication;

receiving a web real time communication web server function identity from a proxy call state control function enhanced for web real time communication;

comparing the at least one identity of all web real time communication web server function identities with the web real time communication web server function identity received from the proxy call state control function; and rejecting an internet protocol multimedia subsystem communication when there is not a match between the at least one identity of all web real time communication web server function identities and the web real time communication web server function identity received from the proxy call state control function.

2. The method according to claim 1, further comprising sending the web real time communication web server function identity received from the proxy call state control function enhanced for web real time communication to a home subscriber server.

3. An apparatus, comprising:

at least one processor; and at least one memory including computer program code, wherein the at least one memory and computer program code are configured, with the at least one processor, to cause the apparatus at least to retrieve at least one identity of all web real time communication web server function identities associated with an internet protocol multimedia subsystem subscription from a home subscriber server, wherein the at least one identity comprises an identity or identities of any web real time communication web server function that is authorized to authenticate an internet protocol multimedia subsystem subscriber in web real time communication;

receive a web real time communication web server function identity from a proxy call state control function enhanced for web real time communication;

compare the at least one identity of all web real time communication web server function identities with the web real time communication web server function identity received from the proxy call state control function; and reject an internet protocol multimedia subsystem communication when there is not a match between the at least one identity of all web real time communication web server function identities and the web real time communication web server function identity received from the proxy call state control function.

4. The apparatus according to claim 3, wherein the at least one memory and computer program code are further configured, with the at least one processor, to cause the apparatus at least to send the web real time communication web server function identity received from the proxy call state control function enhanced for web real time communication to a home subscriber server.

5. The apparatus according to claim 3, wherein the apparatus comprises an interrogating call state control function or a serving call state control function.

6. A method, comprising:
retrieving, by a network node, all identities of any web real time communication web server functions that are blocked;
receiving a web real time communication web server function identity from a proxy call state control function enhanced for web real time communication;
comparing the blocked web real time communication web server function identities with the web real time communication web server function identity received from the proxy call state control function enhanced for web real time communication; and
rejecting internet protocol multimedia subsystem communication when there is a match between the blocked web real time communication web server function identities and the web real time communication web server function identity received from the proxy call state control function enhanced for web real time communication.

7. The method according to claim 6, wherein the retrieving comprises retrieving the identities of web real time communication web server functions that are blocked from a home subscriber server.

8. The method according to claim 7, further comprising sending the web real time communication web server function identity received from the proxy call state control function enhanced for web real time communication to the home subscriber server.

9. The method according to claim 6, wherein the network node comprises a serving call state control function and the method further comprises initiating network deregistration for all users associated with a blocked web real time communication web server function.

10. An apparatus, comprising:
at least one processor; and
at least one memory including computer program code,
wherein the at least one memory and computer program code are configured, with the at least one processor, to cause the apparatus at least to
retrieve all identities of any web real time communication web server functions that are blocked;
receive a web real time communication web server function identity from a proxy call state control function enhanced for web real time communication;
compare the blocked web real time communication web server function identities with the web real time communication web server function identity received from the proxy call state control function enhanced for web real time communication; and
reject internet protocol multimedia subsystem communication when there is a match between the blocked web real time communication web server function identities and the web real time communication web server function identity received from the proxy call state control function enhanced for web real time communication.

11. The apparatus according to claim 10, wherein the at least one memory and computer program code are further configured, with the at least one processor, to cause the apparatus at least to retrieve the identities of web real time communication web server functions that are blocked from a home subscriber server.

12. The apparatus according to claim 11, wherein the at least one memory and computer program code are further configured, with the at least one processor, to cause the apparatus at least to send the web real time communication web server function identity received from the proxy call state control function enhanced for web real time communication to the home subscriber server.

13. The apparatus according to claim 10, wherein the apparatus comprises a serving call state control function, and wherein the at least one memory and computer program code are further configured, with the at least one processor, to cause the apparatus at least to initiate network deregistration for all users associated with a blocked web real time communication web server function.

* * * * *